May 15, 1928.  
C. V. WILLOUGHBY  
1,670,275  
FISHING DEVICE  
Filed July 6, 1926
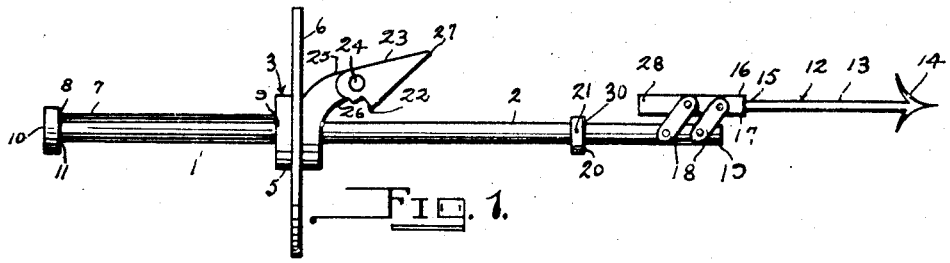
Fig. 1.
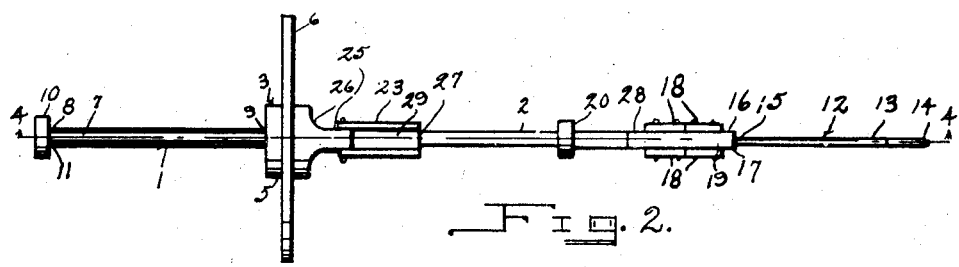
Fig. 2.
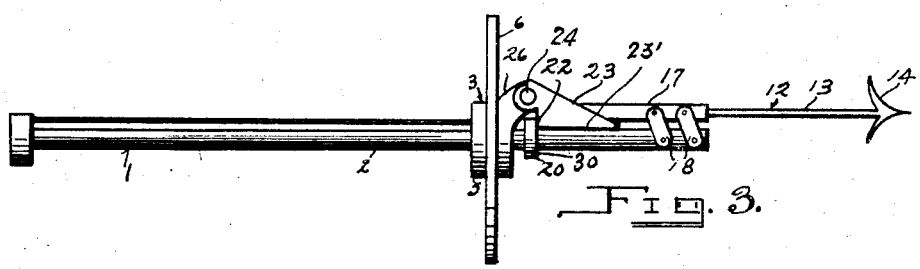
Fig. 3.
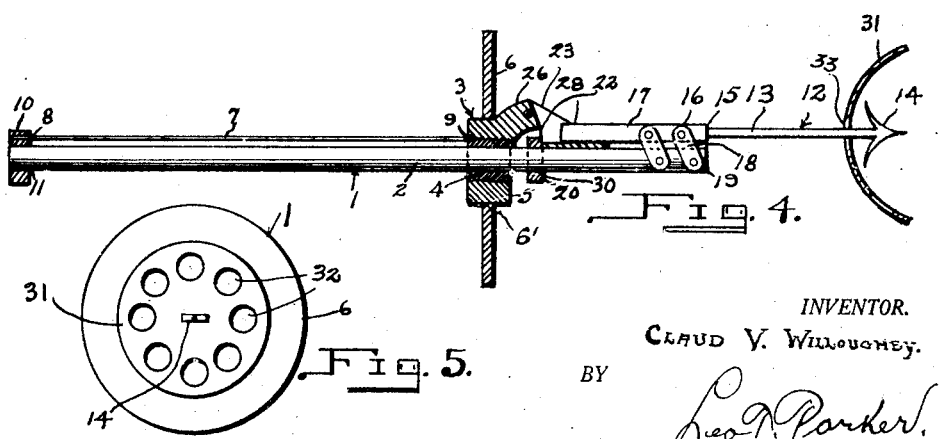
Fig. 4.
Fig. 5.
INVENTOR.  
CLAUD V. WILLOUGHBY.  
BY  
Leo N. Parker  
ATTORNEY.

Patented May 15, 1928.

1,670,275

UNITED STATES PATENT OFFICE.

CLAUD V. WILLOUGHBY, OF NEAR MOUNT WASHINGTON, OHIO, ASSIGNOR TO H. T. COLLING COMPANY, OF CINCINNATI, OHIO.

FISHING DEVICE.

Application filed July 6, 1926. Serial No. 120,591.

The invention relates to apparatus adapted for utilization in obtaining fish.

The objects of the invention are to provide a simple, efficient, practical and economically constructed device having a spear to which bait is attached to attract fish which, when removing said bait are automatically speared and secure themselves thereto; and to provide means whereby the fish are compelled to effectively position themselves while removing said bait, to be speared by the operation of said device.

The invention consists in combination of the elements, arrangement of the parts, and in the details of the construction, as hereinafter specified and claimed.

In the drawings:

Fig. 1 is a side elevational view of the invention shown in unset position;

Fig. 2 is a plan view of the same;

Fig. 3 is the same view in Fig. 1, and showing the device in set position;

Fig. 4 is a section taken on a line corresponding to 4—4 on Fig. 2, and showing a bait guard attached thereto; and Fig. 5 is a front elevational view of the invention shown in Fig. 4.

In the preferred construction of the fishing device 1, I provide the longitudinal rod 2 or support 2 having the stabilizer 3 slidably mounted thereon. The stabilizer consists of the assembled parts comprising the externally threaded tube 4 (slidably mounted on rod 2) and the nut 5 which is threaded to the outer surface of the tube. The disc 6 is suitably secured to the nut 5, as by the nut being forced under pressure in the centrally disposed hole 6' in the disc.

For the purpose of urging the stabilizer 3 and the disc 6 into the position shown in Figs. 1 and 2, the rubber or resilient strip 7 has its ends 8 and 9, respectively, fixed to the nuts 10 and 5. The nut 10 is suitably secured to the rear end 11 of the rod 2.

The resilient strip 7 may be substituted by other suitable resilient means, such as a coil spring or the like.

The spear 12, comprises the staff 13 having the arrow head 14 suitably secured to its front end. The rear end 15 of the staff 13 is suitably secured in a recess in the end 16 of the bar 17 which extends rearwardly of the staff. The spear 12 and the bar 17 are pivotally connected with the rod 2, as by the plates 18 being pivotally connected with the bar and the rear end 19 of the rod 2, whereby the spear extends parallel to and forwardly of the rod.

For the purpose of maintaining the stabilizer 3 in the set position, shown in Figs. 3 and 4, the collar 20 is fixed, by the pin 21, to the front-end 19 of the rod 2 and rearwardly of the stabilizer 3, whereby the front side of the collar is adapted to be engaged by the shoulder 22 of the fastener 23 which is pivotally connected, as by the pin 24, to the outer end 25 of the forwardly protruding arm 26 integrally connected with the nut 5. The shoulder 22 extends at right angles to the inner side 23' of the fastener.

The front end 27 of the fastener is releasably prevented from pivoting upwardly and releasing its shoulder 22 from engagement with the collar 20, as by manually pivoting the bar 17 rearwardly from the position shown in Fig. 1, whereby the rear end 28 of the bar is positioned in the groove 29 in the fastener.

When it is desirable to utilize the invention for the purpose of spearing fish, or other live occupants of water, a suitable bait (not shown) is attached to the arrow point 14, after which stabilizer 3 is manually slid, from the position shown in Figs. 1 and 2, toward the front end 19 of the rod 2, to the position shown in Figs. 3 and 4, thereby giving tension to the strip 7. Then the fastener 23 is forced downwardly with its inner side 23' in engagement with the rod 2 and with its shoulder 22 in engagement with the front side 30 of the collar 20. While the fastener is manually maintained in this position, the bar 17 is manually forced rearwardly, from the position shown in Figs. 1 and 2 to the position shown in Figs. 3 and 4, whereby its end 28 is caused to enter the groove 29 in the fastener, whereby the stabilizer 3 is releasably maintained in the forward position for the reason that the bar 17 holds the fastener in such position that the shoulder 22 prevents the strip 7 from urging the stabilizer toward the rear end of the rod 2.

When the device is in the set position shown in Figs. 3 and 4, and is positioned in the water, a fish in attempting to remove the bait from the head 14 of the spear may pull the bait in a direction outwardly from the stabilizer and parallel to the staff 13 thereby forcing the bar 17 forwardly and removing the end 28, of the bar, from the groove 29 in the fastener, whereby the tension in the resilient strip 7 quickly forces the stabilizer 3 from the collar 20, thereby disengaging the shoulder 22, of the fastener, from the collar, whereby the tension in the strip 7 causes the rod 2 to slide forwardly in the tube 4 and imparts forward movement to the spear 13, embedding the arrow point 14 in the flesh of the fish. The disc 6, being positioned at right angles to the rod 2, resists rapid movement of the stabilizer through the water, whereby a considerable part of the force exerted by the strip 7 is utilized in forcing the arrow point toward and into the fish.

The device may be attached to a usual line, secured to a usual fishing pole, whereby the user may conveniently remove the device, and a fish fastened thereto, from the water. Also, a plurality of the devices may be secured in spaced apart relation to a line having its ends suitably secured to rocks, trees, or the like, whereby the speared fish may be captured by raising the line from the water at intervals.

In Figs. 4 and 5, I show a concave bait guard 31, having a plurality of holes 32 therein. The guard is slidably mounted upon the staff 13, of the spear. After the device is set, the guard may be slid adjacent the arrow point 14, to the position shown in Fig. 4. The purpose of the guard is to compel a fish, when eating the bait to position itself directly in front of the arrow point, whereby when the device is unset or sprung by nibbling of the fish the arrow point is likely to be embedded in its body. When the device is sprung, the staff 13 is forced through the hole 33 in the guard, whereby the guard does not importantly decrease the velocity of the forward movement of the spear.

It is apparent that I have invented a highly desirable device for the purposes intended, and by the use of which the method of capturing fish by means of a pole and line, having a fish-hook connected thereto, is importantly improved, because it is not necessary for the fisherman to be constantly alert and observant when using the invention, as is required when fishing with a hook and line.

While I have chosen to illustrate the form and construction of the invention by the herein drawings and explanations of the same, it is understood that the invention resides in the combination, arrangement of the parts and in the details of the construction, as hereinafter claimed. It is further understood that changes in the precise embodiment of the invention, as disclosed herein, can be made within the scope of what is claimed without departing from the spirit of the invention, as other expedients may readily suggest themselves to the art.

What I claim as new and desire to secure by Letters Patent is:

1. A fishing device comprising a support, a stabilizer slidably mounted on said support and having a disc thereon, a spear pivotally connected with said device, resilient means connecting said support and said stabilizer, and means for releasably maintaining said stabilizer in a predetermined position relative to said support whereby tension is maintained in said resilient means.

2. A fishing device comprising a support, a stabilizer slidably mounted on said support and having a disc thereon, and spear pivotally connected with said support, resilient means connecting said support and said stabilizer, and means for releasably maintaining said stabilizer in a predetermined position relative to said support whereby said device is in set position and tension is maintained in said resilient means to effect movement of said spear when said device is unset.

3. A fishing device comprising a rod, a stabilizer slidably mounted on said rod and having a disc thereon, a spear pivotally connected with said rod, resilient means connecting said rod and said stabilizer, means for releasably maintaining said stabilizer in a predetermined position on said rod in which position tension is maintained in said resilient means, and said resilient means adapted to impart movement to said spear when said tension in said resilient means is released.

4. A fishing device comprising a rod, a stabilizer slidably mounted on said rod, a spear connected with said rod, a collar fixed to said rod, resilient means connected with said stabilizer and said support to force said stabilizer from said spear, means pivoted to said stabilizer and adapted to engage said collar to maintain said stabilizer in predetermined position with tension in said resilient means, and means connected with said spear and adapted to engage said pivoted means to maintain said device in set position, whereby force exerted on said spear is adapted to unset said device and said resilient means is adapted to impart quick forward movement to said spear.

5. A fishing device comprising a rod, a stabilizer and a spear, and said stabilizer being slidably mounted on said rod, a collar fixed to said rod, resilient means connected with said stabilizer and said support, means pivoted to said stabilizer and adapted to engage said collar to maintain said stabilizer in predetermined position with tension in said resilient means, and means connected with said spear and adapted to engage said pivoted means to releasably maintain said device in set position, whereby force exerted on said spear is adapted to unset said device and said resilient means is adapted to impart quick movement to said spear.

CLAUD V. WILLOUGHBY.